US005165437A

United States Patent [19]

Sanders et al.

[11] Patent Number: 5,165,437

[45] Date of Patent: Nov. 24, 1992

[54] HIGH ACCURACY CAM-OPERATED FILL CONTROL

[75] Inventors: Jack D. Sanders; Gary R. Proctor, both of Indianapolis, Ind.

[73] Assignee: Emerson Electric Co., St. Louis, Mo.

[21] Appl. No.: 890,256

[22] Filed: May 22, 1992

[51] Int. Cl.[5] ........ F16K 31/02

[52] U.S. Cl. ........ 137/1; 137/624.11

[58] Field of Search ........ 137/624.11, 624.18, 137/624.2, 624.12, 1, 387

[56] References Cited

U.S. PATENT DOCUMENTS 3,344,625 10/1967 Fogt ........ 137/387 X
3,362,197 1/1968 Reed ........ 137/387 X
3,490,486 1/1970 Cushing ........ 137/387
3,648,487 3/1972 Hoffman ........ 137/387 X

*Primary Examiner*—Alan Cohan
*Attorney, Agent, or Firm*—Robert F. Meyer

[57] ABSTRACT

A high accuracy fill control is accomplished by using a drop-drop cam-operated timer switch in parallel with an electromagnetic water valve in series with a motor start relay and main motor machine windings. The drop-drop cam-operated timer switches almost instantaneously from one position to another, so the timer air gap variable created by the normal rise to make and activate transition is eliminated and other variables are not introduced.

14 Claims, 10 Drawing Sheets

HIGH ACCURACY CAM-OPERATED FILL CONTROL

BACKGROUND OF THE INVENTION

This invention relates to cam-operated dishwasher controls used to provide a timed water fill.

In prior art dishwasher controls, water fill duration is controlled by a cam-operated switch lifting to begin or end a water fill cycle. When the cam-operated switch lifts to control fill duration, lifting of the cam-operated switch requires a cam-follower to ride up a ramp to make contact. The distance the camstack must rotate for the cam follower to ride up the ramp to make contact is called the contact air gap. The contact air gap requires time to traverse resulting in the introduction of a major variable that causes water fill duration to be inaccurate.

Some prior art dishwasher controls use a constant motion drive system to advance the camstack which results in switch actuation rates that are relatively slow. The slow switch actuation rates, acting during the contact air gap, causes fill duration time to vary approximately ±10% with a constant motion drive. Poor fill tolerance permits excessive water usage, excessive heating element power consumption to heat the extra water, and additional wasted power provided to other components such as the water valve and timer motor over the life of the appliance.

To achieve higher fill accuracy, some prior art dishwasher controls use a variable speed camstack advance feature that increases camstack advance speed during fill switching. The faster switching rates achieved in a variable speed dishwasher control decrease the time required to traverse the contact air gap resulting in a fill tolerance within ±2% to 4% of the desired fill duration. But variable speed camstack advance dishwasher controls have the disadvantages of greater cost, greater complexity, decreased reliability, noisier operation, and rougher operator feel.

Another method prior art dishwasher controls have used to increase fill accuracy is to employ drop actuated switches that do not have a contact air gap to traverse and switch almost instantaneously. But in prior art drop actuated switch controls this method has required a separate cam and switch for each function and position desired to be controlled. For instance using this method in a dishwasher control to turn a motor "on" and "off" and turn a water valve "on" and "off" would require four cams and four cam-operated switches. Although this method eliminates the need to traverse a contact air gap, the additional cams and cam-operated switches increase the accumulation of mechanical tolerances which also decreases water fill accuracy.

The recent focus on reducing energy consumption of appliances, along with the Department of Energy dishwasher energy consumption standards to be implemented in 1994, has created the need for a dishwasher cam-operated control that achieves high accuracy water fill control. Although variable speed cam-operated dishwasher controls have good fill accuracy, their undesirable characteristics include greater cost, greater complexity, decreased reliability, often noisy operation, and often rough operator feel. What is desired is a constant speed cam-operated dishwasher control with the attributes of low cost, simplicity, reliability, quiet operation, and smooth operator feel that also achieves high accuracy fill control.

SUMMARY OF THE INVENTION

Accordingly a mechanism is provided to improve the tolerance of timed water fill in an appliance. In general the appliance control system comprises a cam-operated timer means, an electromechanical water valve, a switching means responsive to the cam-operated timer connected in parallel with the electromechanical water valve, and a motor including main machine motor windings connected in series with the electromechanical water valve and the switching means. In general the appliance control system method comprises steps disabling the water valve when the switch means is closed, activation of the water valve when the switch means drops to the open position, and deactivation of the water valve when the switch means again drops to the closed position.

DESCRIPTION OF THE PREFERRED EMBODIMENT

Figure 1:
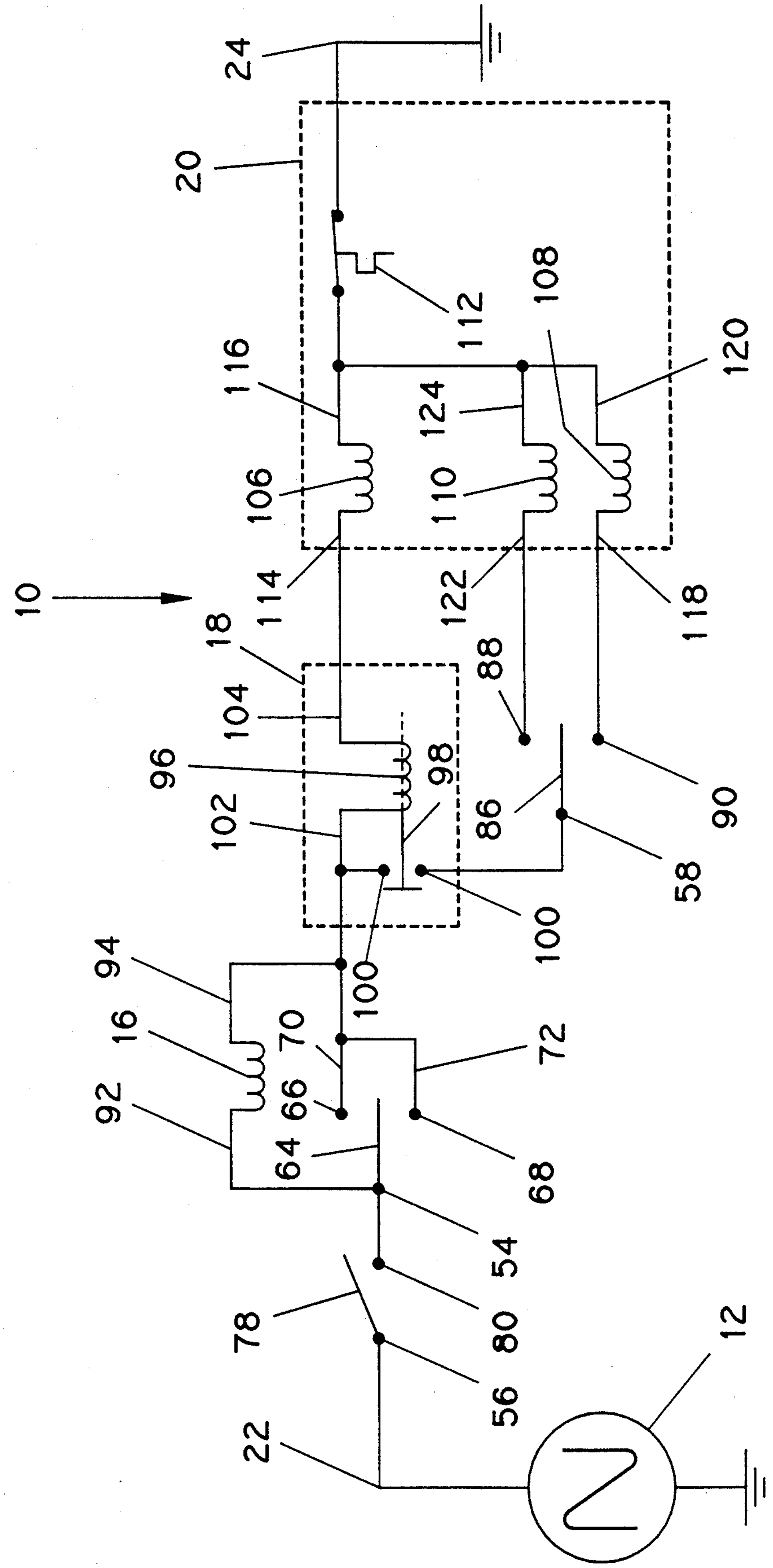
FIG. 1 is a schematic of the circuit.

Referring to FIG. 1, there is shown a low variability fill control circuit 10. The low variability fill control circuit includes an A.C. power source 12, a cam-operated timer 14 (FIG. 2), a water valve 16 connected in parallel with the cam-operated timer 14, a motor start relay 18 connected in series with the water valve 16, and a motor 20 connected in series with the motor start relay 18.

The A.C. power source 12 includes a line connection 22 and a neutral connection 24. The cam-operated timer 14 includes a fill cam 26, a reset cam 28, a wash cam 30, and a switching means 32. The fill cam 26 includes a top profile 34, a middle profile 36, a bottom profile 38, and a rise to top ramp 40. The reset cam 28 includes a middle profile 42, a bottom profile 44, and a rise to middle ramp 46. The wash cam 30 includes a top profile 48, a bottom profile 50, and a rise to top ramp 52. The switching means 32 includes a fill switch 54, a reset switch 56, and a wash switch 58.

The fill switch 54 is a drop-drop actuated single pole double throw switch. The fill switch 54 includes a cam follower 60, a cam follower ramped edge 62, a cam follower contact 64, an upper contact 66, a lower contact 68, an upper contact lead 70, and a lower contact lead 72. The fill switch 54 cam follower contact 64 is connected to A.C. line 22. The fill switch 54 upper contact lead 70 and lower contact lead 72 are tied together and connected to the motor start relay 18.

The reset switch 56 is a single pole double throw switch. The reset switch 56 includes a cam follower 74, a cam follower ramped edge 76, a cam follower contact 78, and a bottom contact 80. The reset switch 56 cam follower contact 78 is connected to A.C. line 22 and the reset switch 56 bottom contact 80 is connected to the water valve 16.

The wash switch 58 is a single pole double throw switch. The wash switch 58 includes a cam follower 82, a cam follower ramped edge 84, a cam follower contact 86, an upper contact 88, and a lower contact 90. The wash switch 58 cam follower contact 86 is connected to the motor start relay 18. The wash switch 58 upper contact 88 and lower contact 90 are connected to the motor 20.

The water valve 16 includes a first end 92 connected to A.C. line 22 and a second end 94 connected to the junction of the fill switch upper contact lead 70 and lower contact lead 72. The water valve 16 is connected in parallel with the fill switch 54 and in series with the motor start relay 18. The water valve is a high inductive impedance device.

The motor start relay 18 includes a coil 96, a plunger 98, and plunger contacts 100. The motor start relay coil 96 has a first end 102 connected to the water valve second end 94 and the fill switch upper contact lead 70 and bottom contact lead 72. The motor start relay coil has a second end 104 connected to the motor 20. The motor start relay 18 is normally closed, so the plunger 98 bridges the plunger contacts 100 creating an electrical circuit. The motor start relay 18 is a low resistance device.

The motor 20 includes main machine motor windings 106, a wash coil 108, a drain coil 110, and a thermal protector 112. The main machine motor windings 106 have a first end 114 connected to the motor start relay coil 96 second end 104, and an AC neutral end 116 connected to the thermal protector 112. The wash coil 108 includes a wash switch end 118 and an A.C. neutral end 120. The drain coil 110 includes a wash switch end 122 and an A.C. neutral end 124. The wash coil 108 and drain coil 110 are connected in parallel, and the wash switch 58 controls activation of the wash coil 108 and drain coil 110. The thermal protector 112 is connected between the main motor windings 106 and the A.C. neutral line 24. The motor 20 is an A.C. induction $\frac{1}{8}$ horsepower device.

Figure 2:
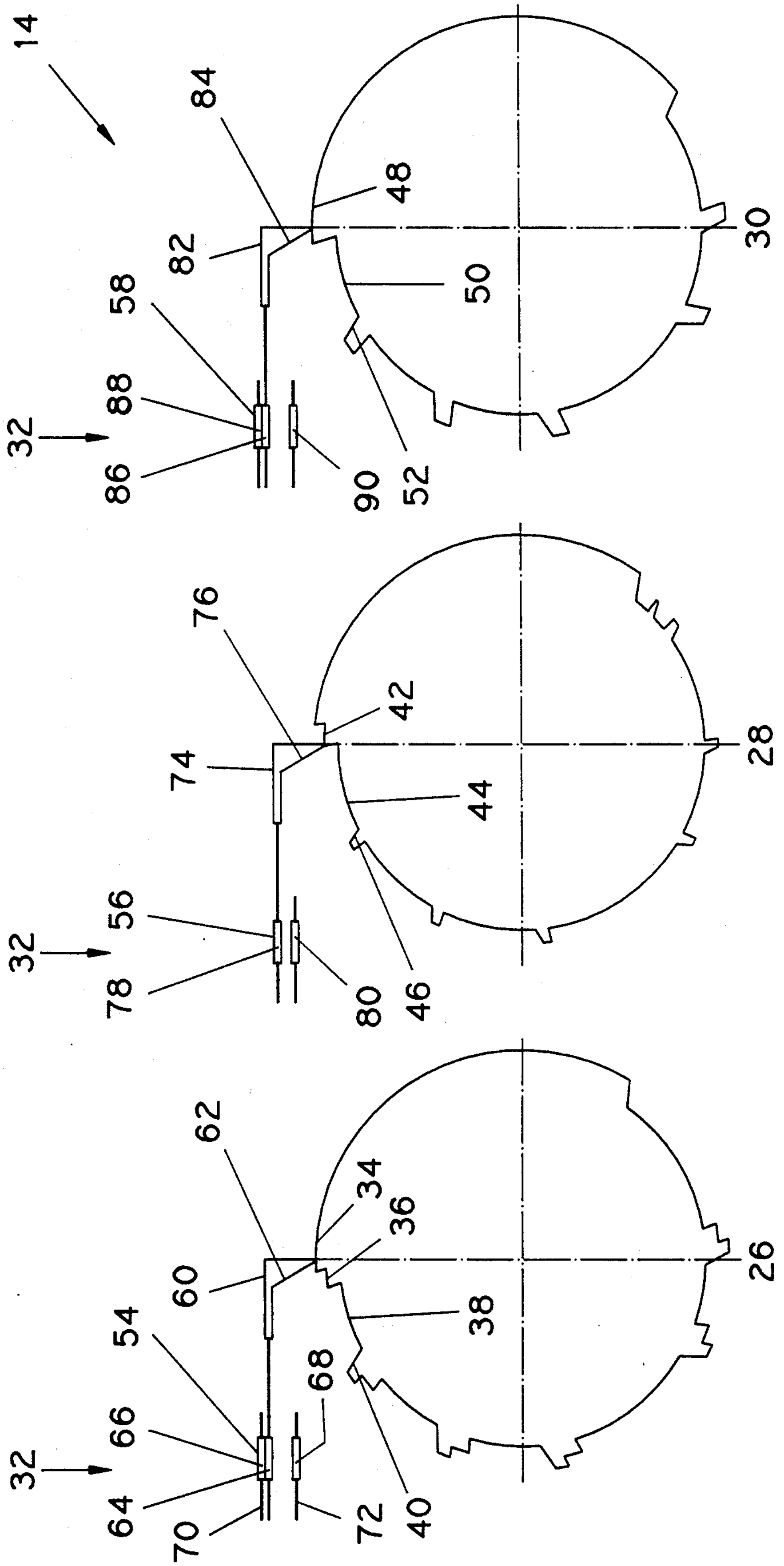
FIG. 2 is a view of the cam operated timer and switching means in a 0 degree operating position.

Operation of the device is now described. Referring to FIG. 2, when the cam-operated timer 14 is at 0 degrees the fill switch 54 cam follower 60 is positioned on the top profile 34, so the cam follower contact 64 forms an electrical connection with the upper contact 66. The reset cam 28 cam follower 74 is positioned on the middle profile 42, so switch 56 is open. The wash cam 30 cam follower 82 is positioned on the top profile 48, so the cam follower contact 86 forms an electrical connection with upper contact 88.

Figure 10:
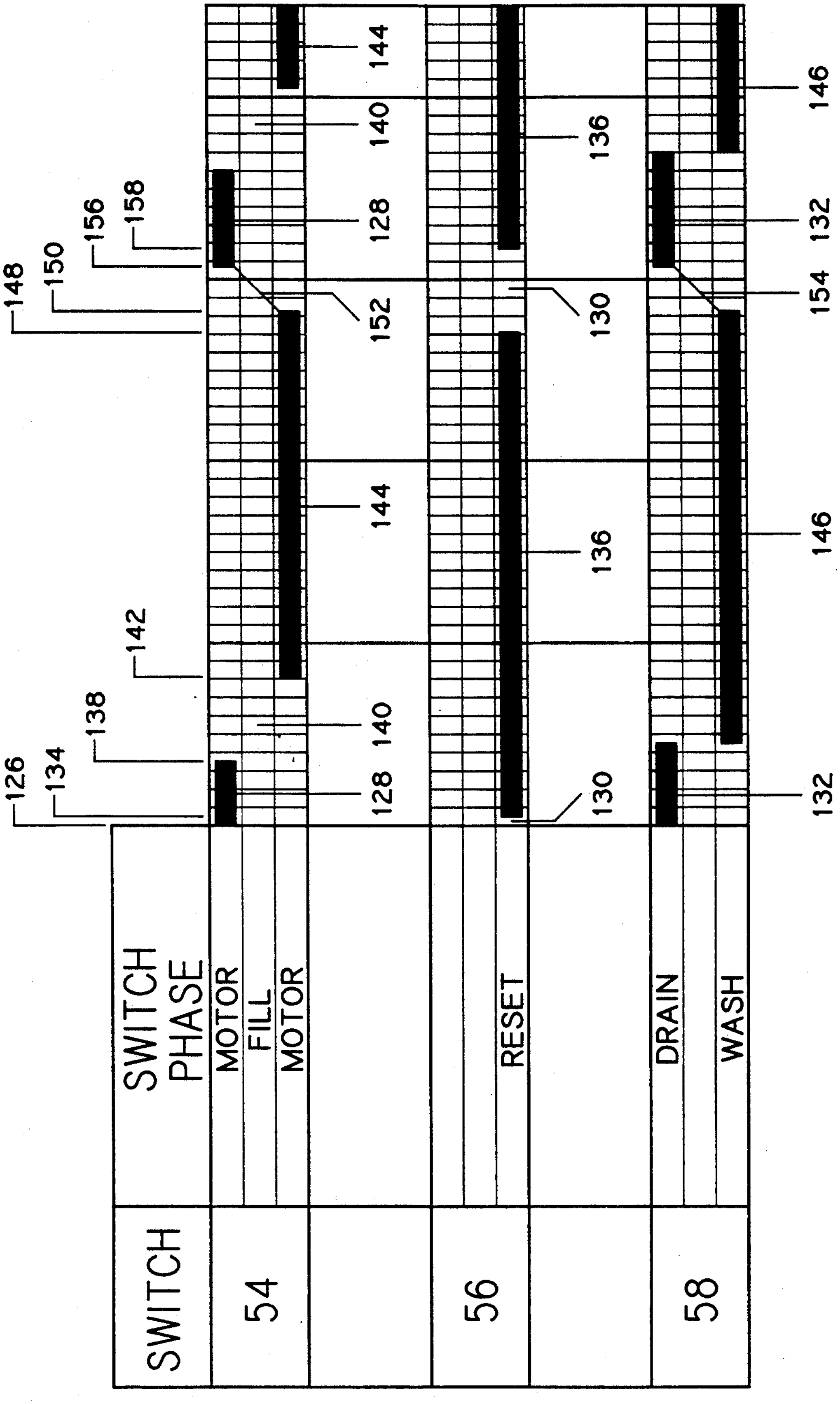
FIG. 10 is a switching means timing diagram.

Referring to FIG. 10, switching means 32 functions are displayed. When the cam-operated timer 14 is in the 0 degree position 126, the fill switch 54 is in the drain phase 128; the reset switch 56 is in the reset position 130; and the wash switch 58 is in the drain phase 132. Referring to FIG. 1 the schematic, current does not flow in the circuit because the reset switch 5 is open.

Figure 3:
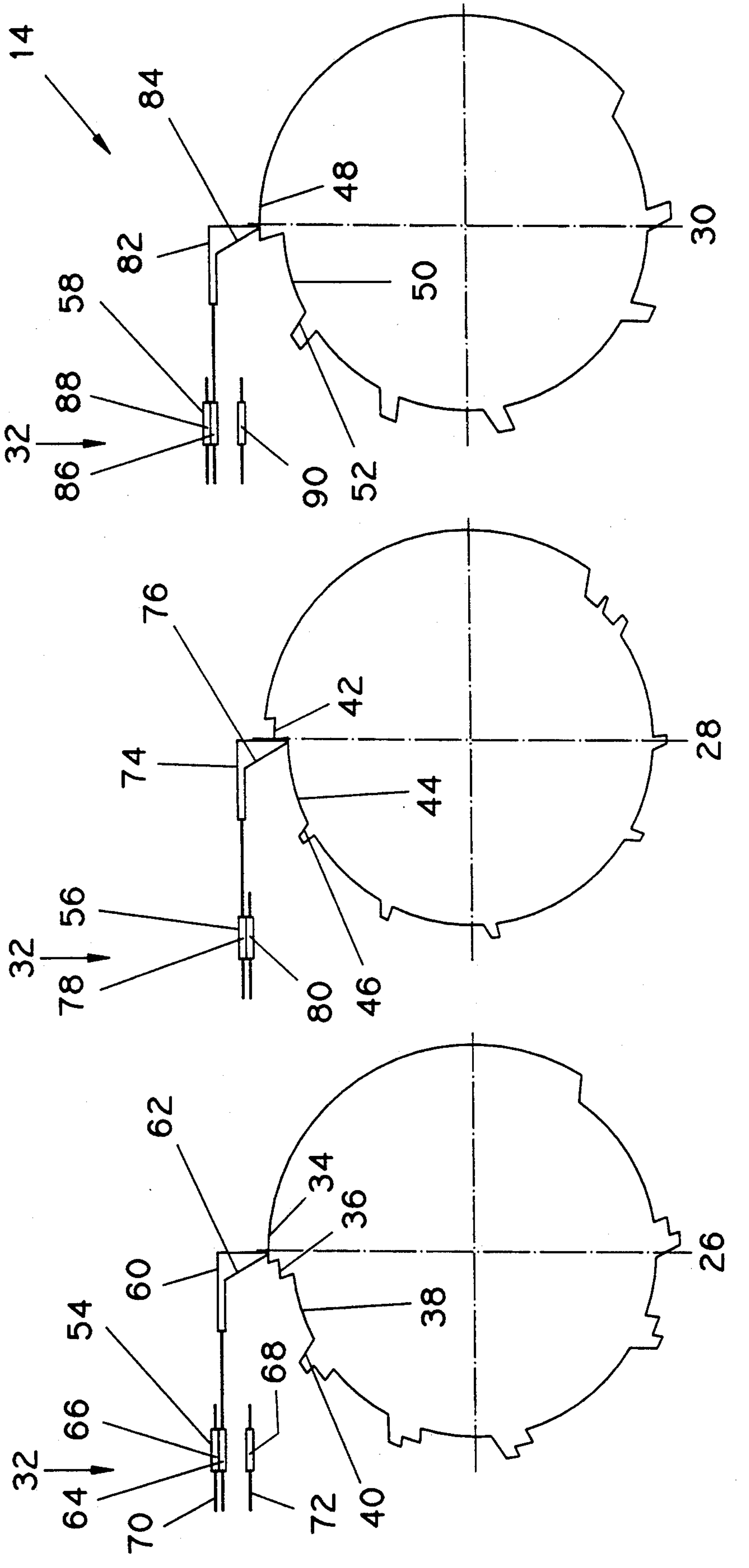
FIG. 3 is a view of the cam operated timer and switching means in a 0.55 degree operating position.

Referring to FIG. 3, when the cam-operated timer 14 is at 0.55 degrees the fill switch 54 cam follower 60 continues to be positioned on the top profile 34, so the cam follower contact 64 maintains the electrical connection with the upper contact 66. The reset switch 56 cam follower 74 has just dropped to the bottom profile 44, so switch 56 has just closed. The wash switch 58 cam follower 82 continues on the top profile 48, so cam follower contact 86 maintains the electrical connection with upper contact 88.

Referring to FIG. 10, switching means 32 functions are displayed. When the cam-operated timer 14 is in the 0.55 degree position 134, the fill switch 54 continues in the drain phase 128; the reset switch 56 has just moved to the nonreset position 136; and the wash switch 58 continues in the drain phase 132.

Referring to FIG. 1 the schematic, current flows through the closed reset switch 56 and through the closed fill switch 54 which shunts current around the water valve 16. Current continues through the motor start relay coil 96 to the motor 20 main machine windings 106 and finally to A.C. neutral 24. The inrush of current caused by charging the motor start relay 18 coil 96 and the motor 20 main machine windings 106 causes the normally open motor start relay 18 plunger 98 to retract closing the motor start relay 18 contacts 100. With the motor start relay contacts 100 closed current flows to the wash switch 58 cam follower contact 86. Since the wash switch 58 cam follower contact 86 is mated with the upper contact 88, current is provided to the motor drain coil 110. Current to the drain coil 110 causes the motor 20 to begin rotation in the drain direction. Once the inrush of current has subsided, the motor start relay 18 plunger 98 extends opening contacts 100, so current no longer flows to the wash switch 58.

Figure 4:
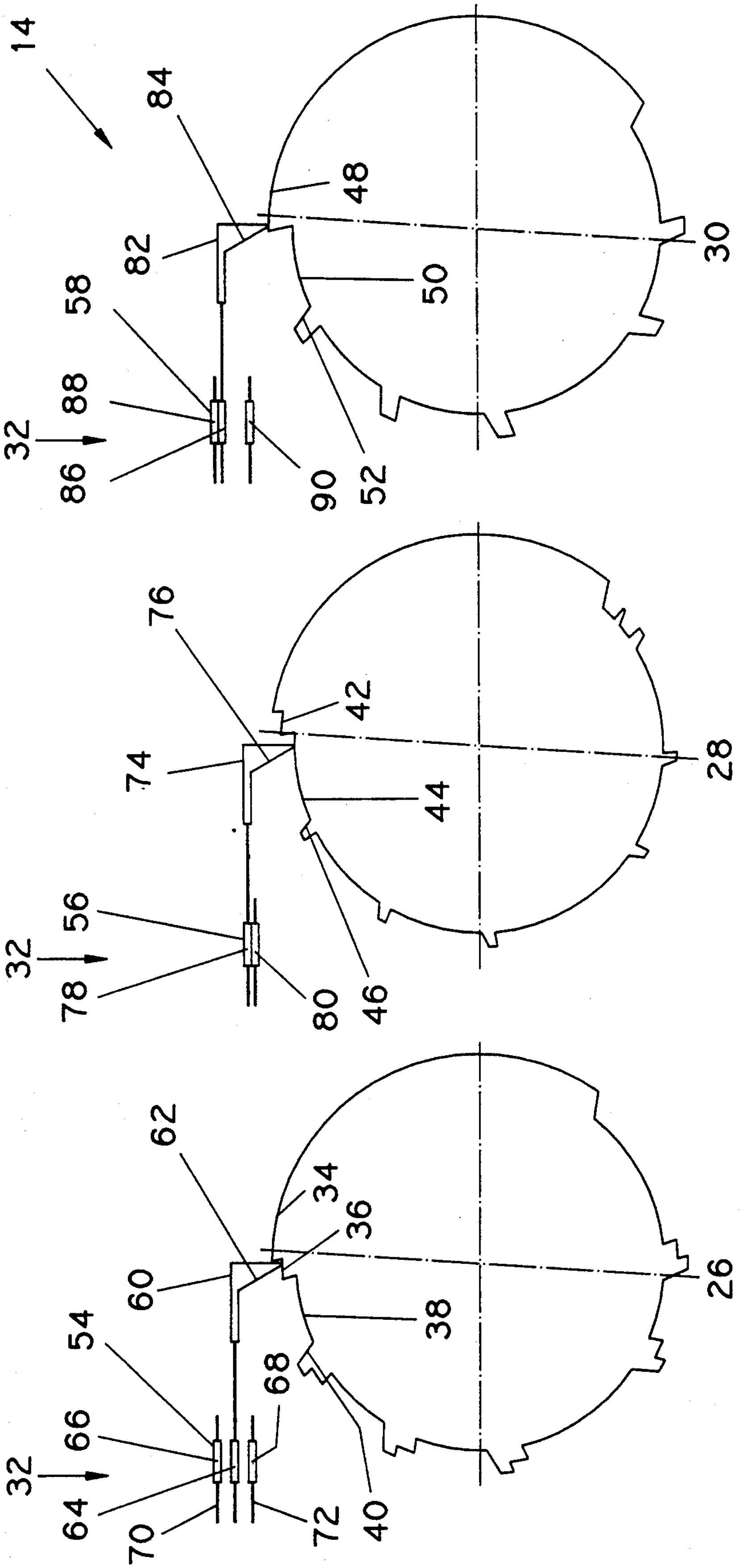
FIG. 4 is a view of the cam operated timer and switching means in a 3.50 degree operating position.

Referring to FIG. 4, when the cam-operated timer 14 is at 3.5 degrees, the fill switch 54 cam follower 60 has just dropped to the middle profile 36, so the reset switch 54 is open. The transition of cam follower 60 from the top profile 34 to the middle profile 36 is almost instantaneous.

At 3.5 degrees the reset switch 56 cam follower 74 continues on the bottom profile 44, so the reset switch 56 cam follower contact 78 maintains the electrical connection with the bottom contact 80. The wash cam 30 cam follower 82 continues to be positioned on the top profile 50, so the cam follower contact 86 maintains an electrical connection with upper contact 88.

Referring to FIG. 10, switching means 32 functions are displayed. When the cam-operated timer 14 is in the 3.5 degree position 138, the fill switch 54 has just switched to the fill phase 140; the reset switch 56 continues in the nonreset position 136; and the wash switch 58 continues in the drain phase 132.

Referring to FIG. 1 the circuit schematic, current flows through the reset switch 56. Since the fill switch 54 is open, current is no longer shunted around the water valve 16. Current flows through the water valve 16 and through the motor start relay 18 coil 96 to the motor 20 main machine windings 106 and finally to A.C. neutral 24. The motor start relay 18 continues in the normally open position, so contacts 100 are open. With contacts 100 open, no current flows to the wash switch 58.

Figure 5:
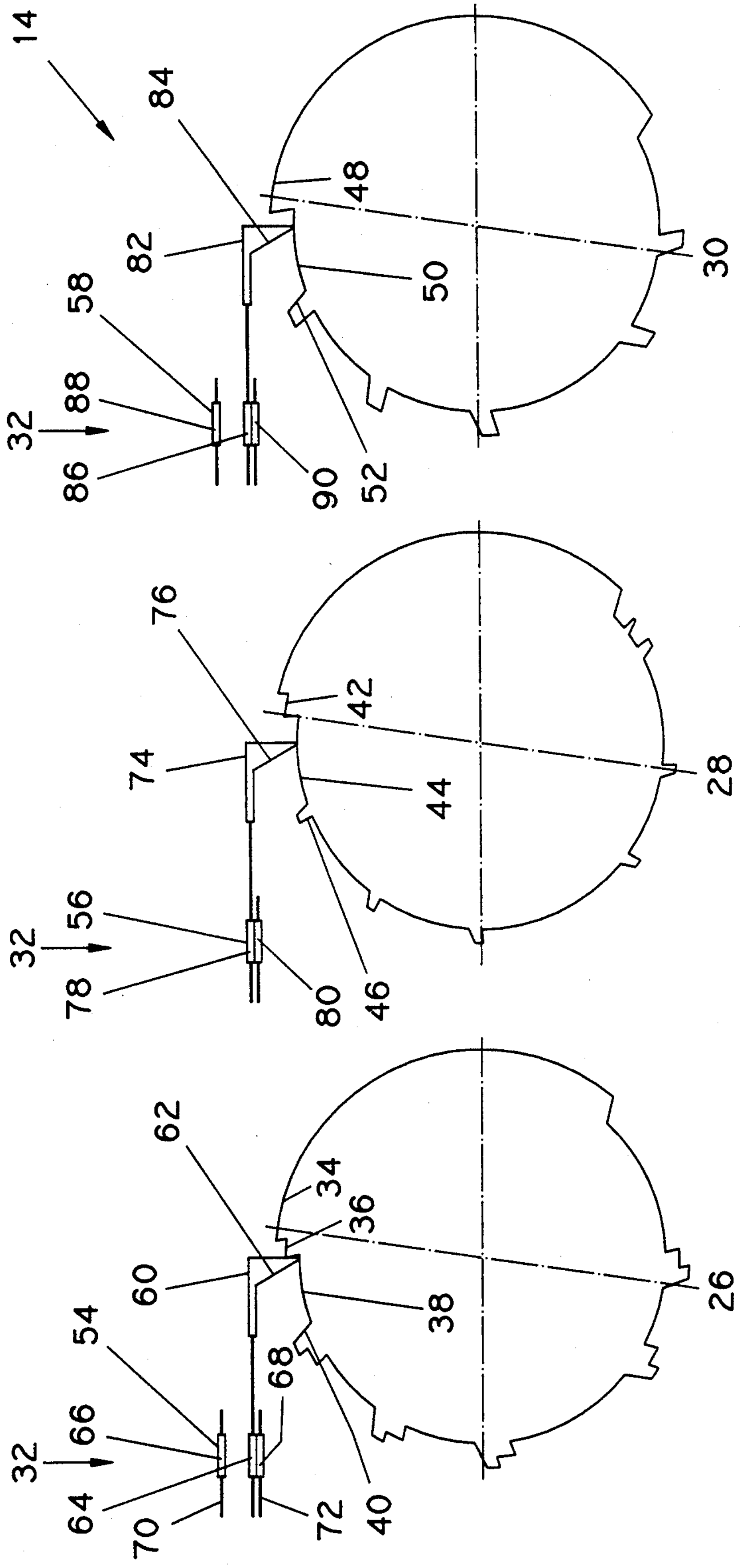
FIG. 5 is a view of the cam operated timer and switching means in a 8.10 degree operating position.

Referring to FIG. 5, when the cam-operated timer 14 is at 8.1 degrees, the fill switch 54 cam follower 60 has just dropped to the bottom profile 38, so the cam follower contact 64 is making an electrical connection with the bottom contact 68. The transition of cam follower 60 from the middle profile 36 to the bottom profile 38 at 8.1 degrees is almost instantaneous.

Also at 8.1 degrees, the reset switch 56 cam follower 74 continues on the bottom profile 44, so the cam follower contact 78 maintains the electrical connection with the bottom contact 80. The wash switch 58 cam follower 82 has just dropped to the bottom profile 50, so the cam follower contact 86 makes an electrical connection with bottom contact 90.

Referring to FIG. 10 switching means 32 functions are displayed. When the cam-operated timer 14 is in the 8.1 degree position 142, the fill switch 54 has just ceased the fill phase 140 and entered the wash phase 144; the reset switch 56 continues to be in the nonreset position 136; and the wash switch 58 continues in the wash phase 146.

Referring to FIG. 1, the schematic, current flows through the closed reset switch 56 and through the closed fill switch 54 that shunts current around the water valve 16, ceasing water valve operation. Current continues through the motor start relay 18 coil 96 to the motor 20 main machine windings 106 and finally to A.C. neutral 24. The motor start relay 18 continues in the normally open position so contacts 100 are open. With contacts 100 open, no current flows to the wash switch 58.

Figure 6:
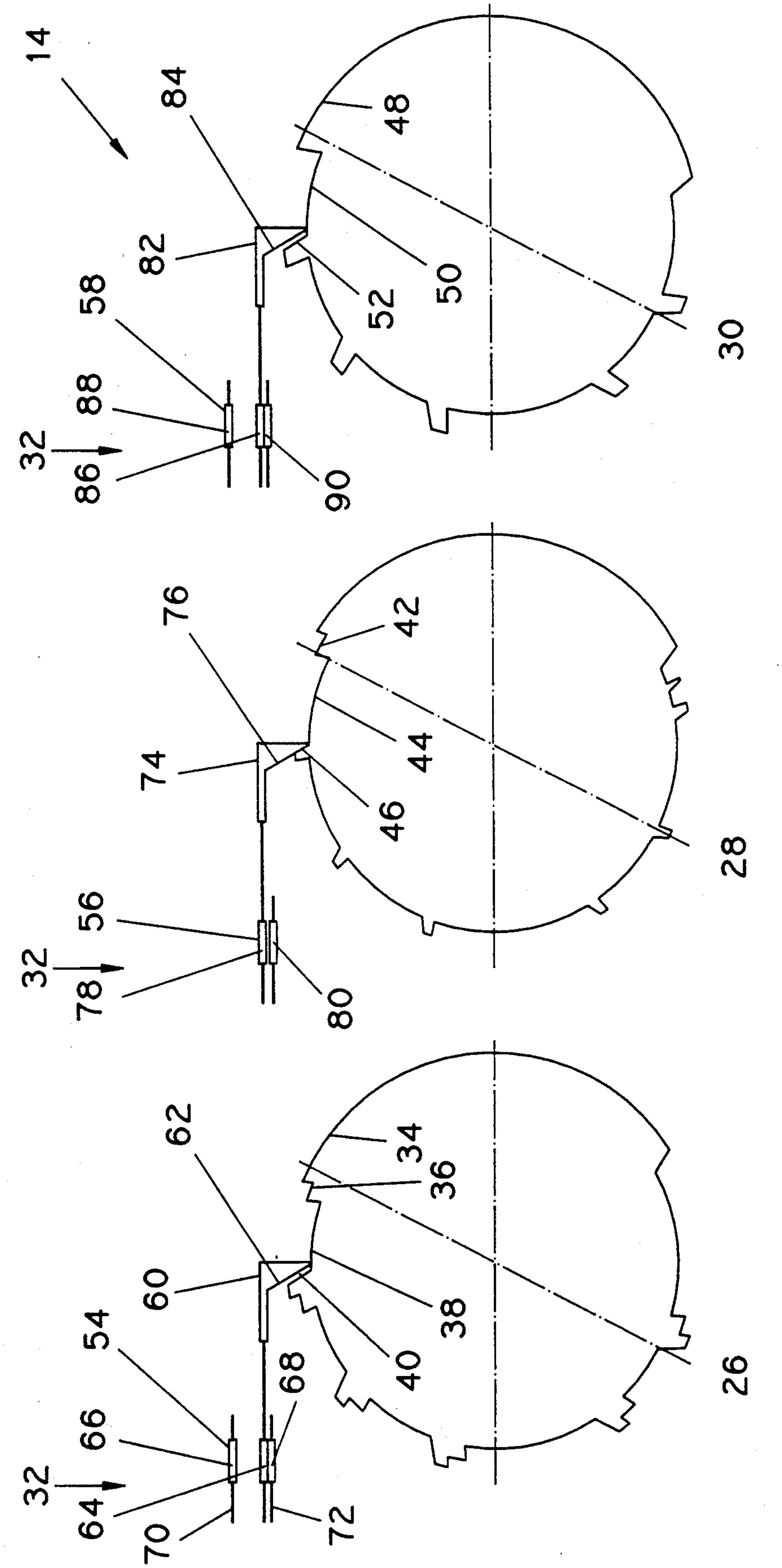
FIG. 6 is a view of the cam operated timer and switching means in a 27.10 degree operating position.

Referring to FIG. 6, when the cam-operated timer 14 is at 27.10 degrees, the fill switch 54 cam follower 60 continues on the bottom profile 38, so the cam follower contact 64 continues making an electrical connection with the bottom contact 68. The reset switch 56 cam follower ramped edge 76 has contacted the rise to middle ramp 46 causing the cam follower contact 78 to just break contact with the lower contact 80, opening reset switch 56. The wash switch 58 cam follower 82 continues on the bottom profile 50, so the cam follower contact 86 maintains the electrical connection with the bottom contact 90.

Referring to FIG. 10, switching means 32 functions are displayed. When the cam-operated timer 14 is in the 27.10 degree position 148, the fill switch continues in the wash phase 144; the reset switch has just moved to the reset position 130; and the wash switch also continues in the wash phase 146. Referring to FIG. 1 the schematic, current does not flow in the circuit because the reset switch 56 is open.

Figure 7:
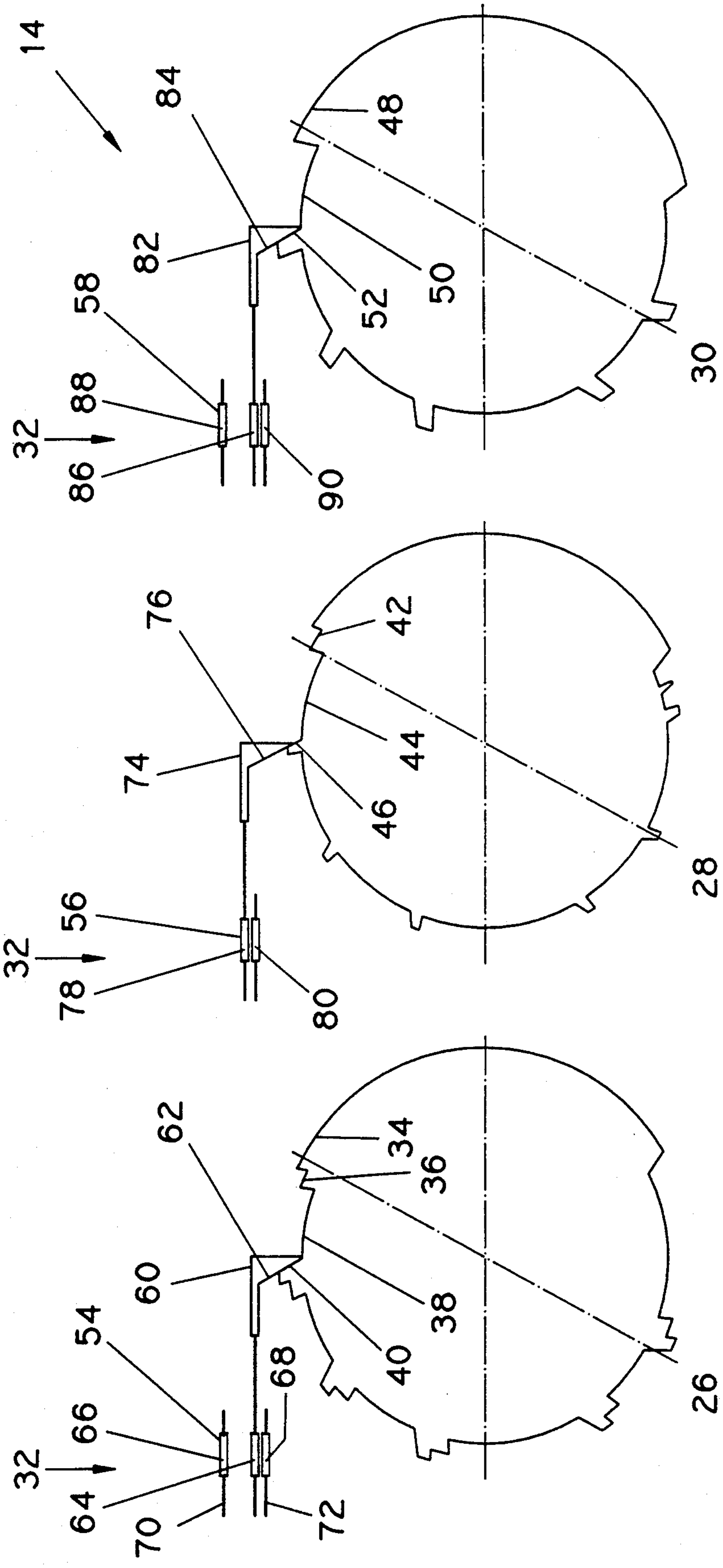
FIG. 7 is a view of the cam operated timer and switching means in a 28.25 degree operating position.

Referring to FIG. 7, when the cam-operated timer 14 is at 28.25 degrees, the fill switch 54 cam follower ramped edge 62 has contacted the rise to top ramp 40 causing the cam follower contact 64 to just break the electrical connection with lower contact 68, so the fill switch 54 is open. The reset switch 56 cam follower 74 continues on the middle profile 42, so switch 56 cam follower contact 78 and bottom contact 80 are still open. The wash switch 58 cam follower ramped edge 84 has contacted the rise to top ramp 52 causing the cam follower contact 86 to just break contact with the lower contact 90, so the wash switch 58 is open.

Referring to FIG. 10, the switching means 32 functions are displayed. When the cam-operated timer 14 is in the 28.25 degree position 150, the fill switch 54 has just ended the wash phase 144 and is beginning the transition to top profile phase 152; the reset switch 56 continues in the reset position 130; and the wash switch 58 has just ended the wash phase 146 and is beginning the transition to top profile phase 154. Referring to FIG. 1 the schematic, current does not flow in the circuit because the reset switch 56 continues to be open.

Figure 8:
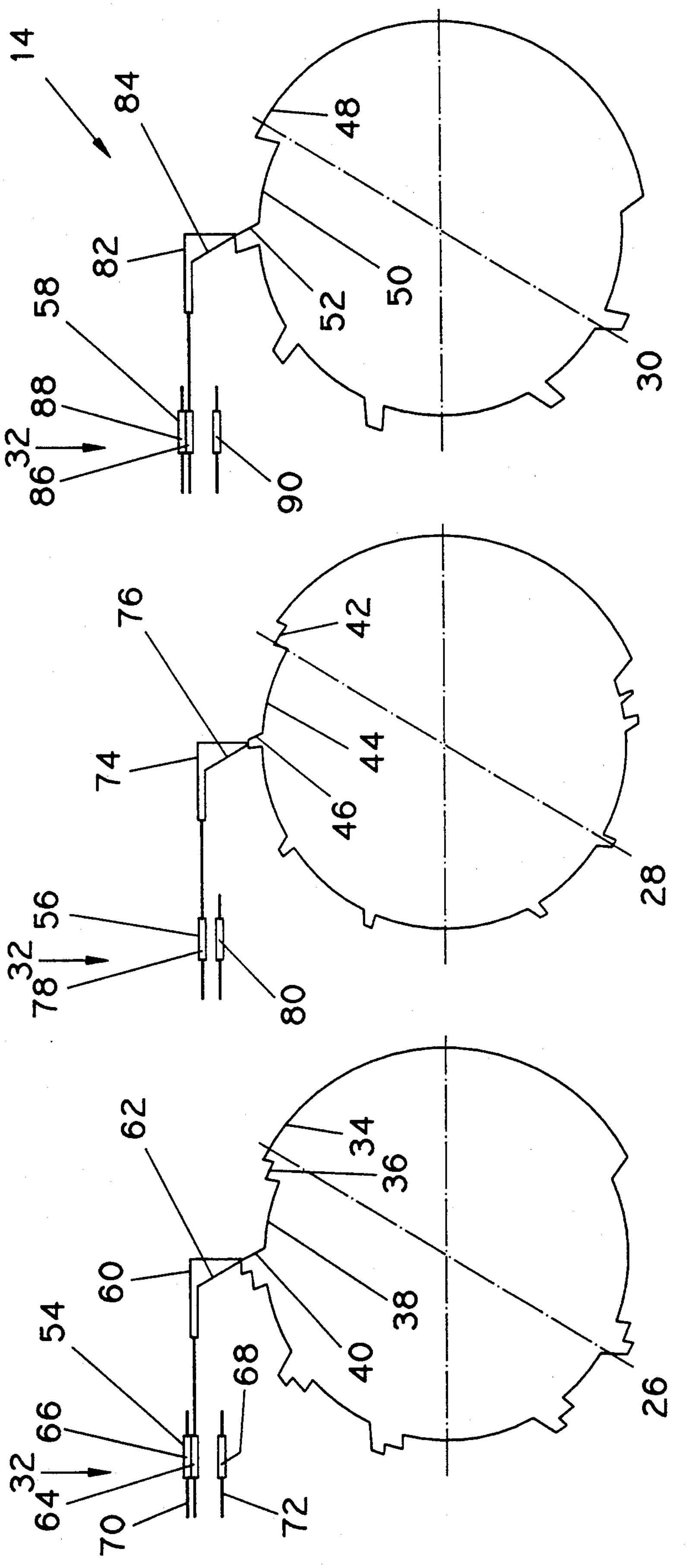
FIG. 8 is a view of the cam operated timer and switching means in a 30.70 degree operating position.

Referring to FIG. 8, when the cam-operated timer 14 is at 30.7 degrees, the fill switch 54 cam follower 60 has just risen to the top profile 34 causing the cam follower contact 64 to make an electrical connection with the upper contact 66. The reset switch 56 cam follower 74 continues on the middle profile 42, so switch 56 cam follower contact 78 and bottom contact 80 continue to be open. The wash switch 58 cam follower 82 has just risen to the top profile 48 causing the cam follower contact 86 to just make an electrical connection with the upper contact 88.

Referring to FIG. 10, switching means 32 functions are displayed. When the cam-operated timer 14 is in the 30.7 degree position 156, the fill switch 54 has just entered the drain phase 128; the reset switch 56 continues in the reset position 130; and the wash switch 58 has also just entered the drain phase 132. Referring to FIG. 1 the schematic, current does not flow in the circuit because the reset switch 56 is open.

Figure 9:
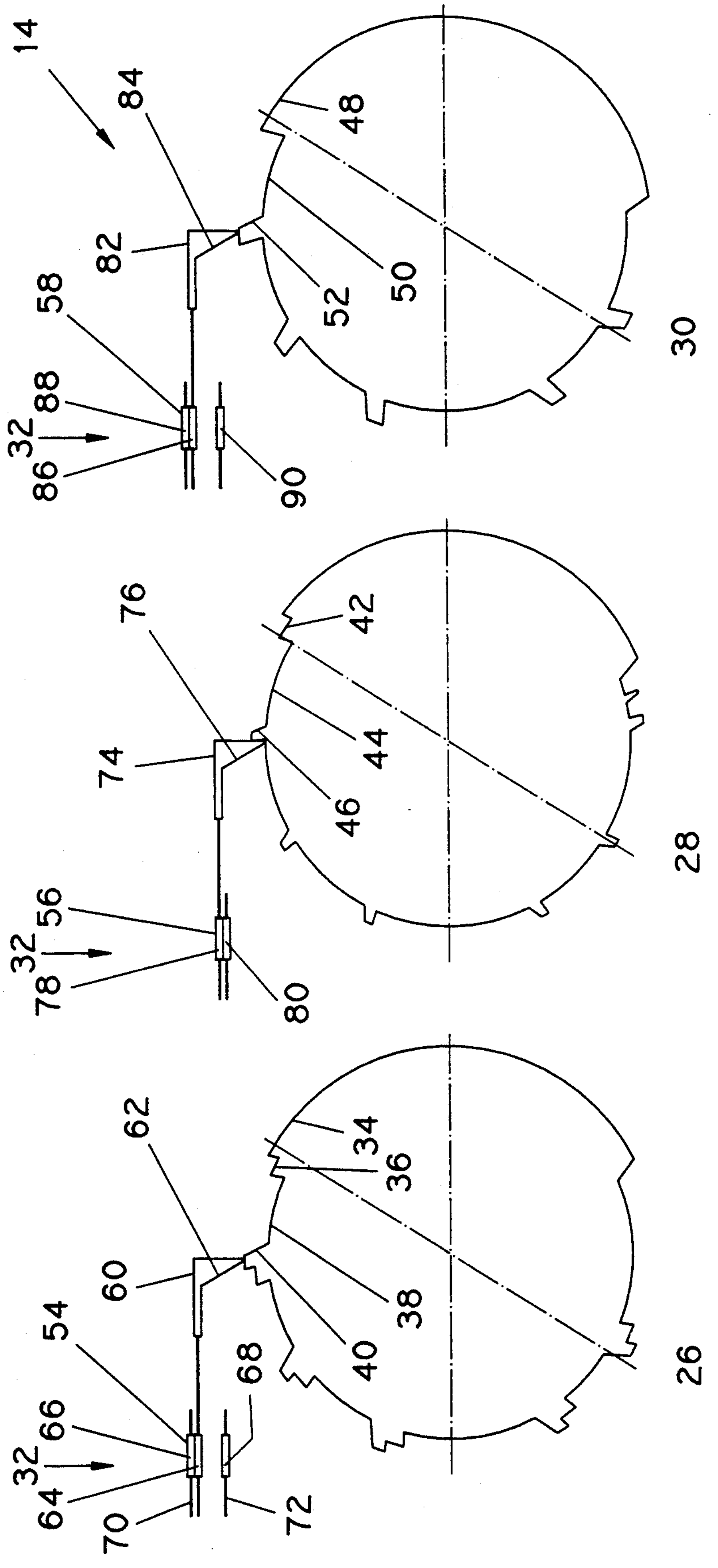
FIG. 9 is a view of the cam operated timer and switching means in a 31.70 degree operating position.

Referring to FIG. 9, when the cam-operated timer 14 is at 31.70 degrees, the fill switch 54 cam follower 60 continues on the top profile 34 with the cam follower contact 64 maintaining contact with the upper contact 66. The reset switch 56 cam follower 74 has just dropped from the middle profile 42 to the bottom profile 44 causing cam follower contact 78 to just make contact with the bottom contact 80, closing switch 56. The wash switch 58 cam follower 82 continues on the top profile 48, so the cam follower contact 86 maintains contact with the upper contact 88.

Referring to FIG. 10, switching means 32 functions are displayed. When the cam-operated timer 14 is in the 31.7 degree position 158, the fill switch 54 continues in the drain phase 128; the reset switch 56 has just entered the nonreset phase 136; and the wash switch 58 continues in the drain phase 132.

Referring to FIG. 1 the schematic, current flows through the closed reset switch 56 and through the closed fill switch 54 which shunts current around the water valve 16. Current continues through the motor start relay 18 coil 96 to the motor 20 main machine windings 106 and finally to A.C. neutral 24. The inrush of current caused by the charging of the motor start relay 18 coil 96 and the motor 20 main machine windings 106 causes the normally open motor start relay 18 plunger 98 to retract closing the motor start relay 18 contacts 100. With the motor start relay 18 contacts 100 closed current flows to the wash switch 58 cam follower contact 86. Since the wash switch 58 cam follower contact 86 is mated with the upper contact 88, current is provided to the motor 20 drain coil 110. Current to the drain coil 110 causes the motor 20 to begin rotation in a drain direction. Once the inrush of current has subsided, the motor start relay 18 plunger 98 extends opening contacts 100, so current no longer flows to the wash switch 58.

What is claimed is:

1. An appliance control system comprising:

(a) a cam-operated timer, (b) an electromechanical water valve controlled by said cam-operated timer, (c) a switching means responsive to said cam-operated timer with a fill switch connected in parallel with said electromechanical water valve, and (d) a motor connected in series with said electromechanical water valve.

2. An appliance control system according to claim 1 wherein said fill switch is a drop-drop actuated switch with an almost instantaneous transition time that operates said electromechanical water valve.

3. An appliance control system according to claim 1 wherein said switching means includes a reset switch that prevents activation of said electromechanical water valve when said fill switch is resetting.

4. An appliance control system according to claim 2 wherein said fill switch is a drop-drop actuated switch with an open position, and when said drop-drop actuated switch opens said electromechanical water valve will activate, and said motor will cease to operate.

5. An appliance control system according to claim 2 wherein said fill switch is a drop-drop actuated switch with a closed position, and when said drop-drop actuated switch closes said electromechanical water valve will cease to operate, and said main motor will begin operating.

6. An appliance control system according to claim 1 wherein when said electromechanical water valve has a voltage drop of such proportion to prevent said motor operation when said drop-drop actuated switch is open.

7. An appliance control system according to claim 1 wherein said motor includes main motor windings connected in series with a motor start relay.

8. An appliance control system according to claim 1 wherein said electromechanical water valve consumes approximately 10 Watts of power.

9. An appliance control system comprising:

(a) a cam-operated timer, (b) an electrically operated water valve controlled by said cam-operated timer, (c) electrical switches responsive to said cam-operated timer one of which is connected in parallel with said electrically operated water valve, and (d) a motor connected in series with said electrically operated water valve.

10. An appliance control system according to claim 9 wherein said electrical switches include a drop switch that transitions almost instantaneously between predetermined drop positions.

11. An appliance control system according to claim 9 wherein said electrically operated water valve creates a large voltage drop during operation preventing said motor from operating.

12. In a control system for an electromechanical device having a cam operated drop actuated switch connected in parallel with an electromechanical water valve, a method for controlling the quantity of water fill for a timed duration comprising steps of:

(a) activation of said electromechanical water valve when said cam-operated drop actuated switch drops to an open position, and (b) deactivation of said electromechanical water valve when said cam-operated drop actuated switch drops to a closed position.

13. The method according to claim 12 wherein disabling and deactivation of said electromechanical water valve is accomplished by shunting current around said electromechanical water valve, so adequate current is not available to operate said electromechanical water valve.

14. The method according to claim 12 wherein activation of said water valve is accomplished by opening a shunt circuit, so all current must flow through said electromechanical water valve causing said electromechanical water valve to activate.

* * * * *